US010642885B2

(12) United States Patent
Tarvainen (10) Patent No.: US 10,642,885 B2
(45) Date of Patent: May 5, 2020

(54) GROUPING IMAGES ACCORDING TO CONTEXT (71) Applicant: Microsoft Technology Licensing, LLC, Redmond, WA (US)

(72) Inventor: Tomi Tarvainen, Espoo (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 299 days.

(21) Appl. No.: 15/263,286

(22) Filed: Sep. 12, 2016

(65) Prior Publication Data
US 2018/0075064 A1    Mar. 15, 2018

(51) Int. Cl.
*G06F 16/00*    (2019.01)
*G06F 16/583*    (2019.01)
*G06F 16/16*    (2019.01)

(52) U.S. Cl.
CPC ........ *G06F 16/5838* (2019.01); *G06F 16/164* (2019.01)

(58) Field of Classification Search
CPC .......................... G06F 16/164; G06F 16/5838
See application file for complete search history.

(56) References Cited

U.S. PATENT DOCUMENTS

| 8,862,663 | B2 | 10/2014 | Pratt et al. |
| 9,143,601 | B2 | 9/2015 | Padmanabhan et al. |
| 2005/0081135 | A1* | 4/2005 | Kindberg ............... G06Q 10/10 715/205 |
| 2011/0211534 | A1 | 9/2011 | Schmidt et al. |
| 2011/0235858 | A1* | 9/2011 | Hanson ................... G06F 16/51 382/103 |
| 2013/0117365 | A1* | 5/2013 | Padmanabhan ....... H04W 4/206 709/204 |
| 2013/0275505 | A1 | 10/2013 | Gauglitz et al. |
| 2015/0134371 | A1 | 5/2015 | Shivakumar et al. |
| 2015/0242444 | A1 | 8/2015 | Campbell et al. |
| 2016/0269675 | A1* | 9/2016 | Tsujimoto .............. H04N 5/772 |

OTHER PUBLICATIONS

"Eversnap", Retrieved on: Apr. 20, 2016, 4 pages, Available at: http://www.geteversnap.com/how-does-it-work.html.
Crabbe, Lauren, "Connect: Napa for iOS shares event photos with friends (and no one else)", Published on: Apr. 24, 2013, 2 pages., Available at: http://connect.dpreview.com/post/2126270722/napa-appa.

(Continued)

*Primary Examiner* — Dinku W Gebresenbet (57) ABSTRACT

A method and apparatus for grouping and sharing images are disclosed. A sequence of media data entities that include at least one digital image frame is obtained. The least one digital image frame includes an optical machine-readable code that includes a contextual collection identifier and a sharing destination. The contextual collection identifier and the sharing destination from the optical machine-readable code is identified and a contextual collection is created based on the contextual collection identifier. Subsequent media data entities are added to the contextual collection, a selection of media data entities to be shared in the sharing destination are received, and the media data entities to the sharing destination are uploaded based on the selection.

20 Claims, 4 Drawing Sheets

(56) References Cited

OTHER PUBLICATIONS

"Photago", Retrieved on: Apr. 20, 2016, 3 pages, Available at: https://photago.com/info.
"Cluster", Retrieved on: Apr. 20, 2016, 7 pages, Available at: https://cluster.co/.
Mead-Green, Rob, "Macworld: Tips for using the camera and photos app on the iPad or iPhone", Published on: Jul. 14, 2014, 7 pages, Available at: http://www.macworld.co.uk/how-to/iosapps/tips-photos-on-iphone-ipad-3530380/.

* cited by examiner

GROUPING IMAGES ACCORDING TO CONTEXT

BACKGROUND

Digital image frames can be captured by various types of devices, such as digital cameras and portable and mobile devices incorporating a digital camera or a digital camera module. When collected and grouped, the images can be added to albums. Metadata of each image can also be used to group these images and share them in social media.

Efficiency of arranging and organizing images and other media captured at the same events depends on the methods and devices used for their grouping.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The apparatus according to the present application comprises a processor which is configured to analyze a sequence of media files. These files may be received or created by the apparatus itself. The apparatus finds a machine readable code in one of the media files and creates a contextual collection for files that follow the one with the readable code. The code itself provides the rules for the contextual collection and sharing destination. The user may then select files from the contextual collection and share them in the said destination.

Many of the attendant features will be more readily appreciated as they become better understood by reference to the following detailed description considered in connection with the accompanying drawings. The embodiments described below are not limited to implementations which solve any or all of the disadvantages of known image sorting methods.

DESCRIPTION OF THE DRAWINGS

The present description will be better understood from the following detailed description read in light of the accompanying drawings, wherein.

DETAILED DESCRIPTION

The detailed description provided below in connection with the appended drawings is intended as a description of a number of embodiments and is not intended to represent the only forms in which the embodiments may be constructed, implemented, or utilized.

At least some of the embodiments and examples described below may allow, for example, reliable and efficient grouping of media data entities having the same context and sharing them between multiple devices.

Figure 1:
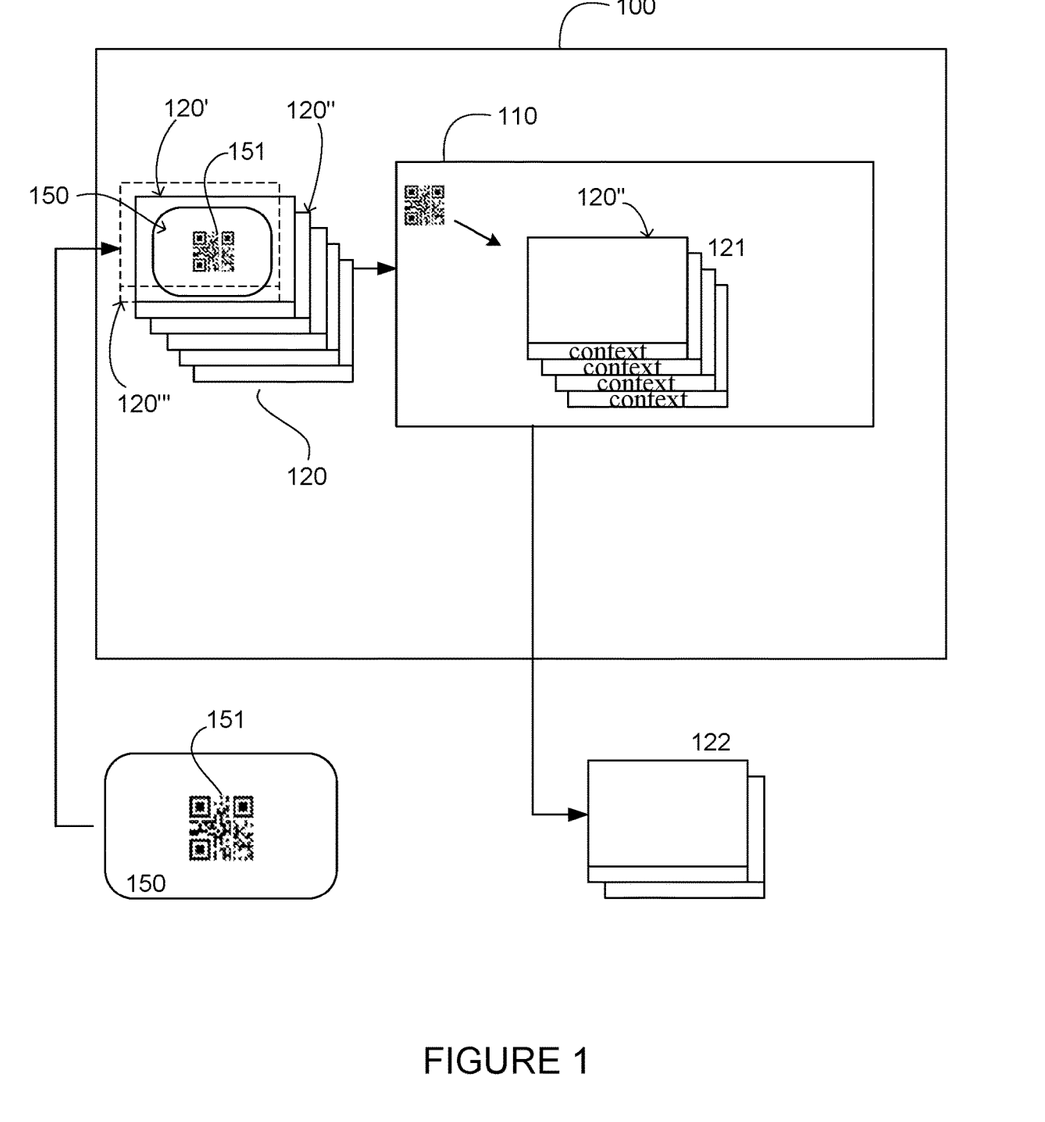
FIG. 1 illustrates schematically an apparatus capable of creating contextual collections according to an embodiment.

The apparatus 100 of FIG. 1 may be, for example, a server computer which may be configured to operate as part of a cloud service or for any other appropriate server operations, a personal computer, a laptop computer, a tablet computer, a smartphone, a mobile phone, a digital image displaying apparatus configured to serve for displaying digital images or an apparatus of any other appropriate type.

The apparatus 100 comprises a processing unit 110 which is configured to obtain a sequence of media data entities 120, individual entities marked by 120', 120" and illustrated as digital images in the Figures. These digital images may be received from a device that can be a capturing device and/or a memory storing the images. The memory may be located outside the device, for example on an external memory, a memory card, a cloud memory, or in the internal storage of the device. As it is clear to a skilled person, the media data entities may include file types other than digital images.

Obtaining a media data entity comprising image data, and possibly metadata, of a digital image frame constitutes an example of obtaining image data of that digital image frame.

A "digital image frame", or shortly a "frame", refers to a data content captured via exposure of pixels or some other light-sensing element(s) of an image sensor. A frame thus comprises image data enabling composition of a displayable digital image on the basis of that image data. Image data of a digital image frame may comprise, for example, information about light to which pixels of an image sensor were exposed. A frame may be captured as a frame for a still image or as one frame of a video sequence or some other frame sequence or group of frames.

In the example of FIG. 1, each obtained media data entity 120', 120" comprises image data of one digital image frame. In other embodiments, one media data entity may comprise image data of several digital image frames.

"Obtaining" a media data entity or any other appropriate data content refers to any appropriate way of providing available, for automatic data processing and/or storage purposes, such data content. For example, such data content or a part of such may be obtained via any appropriate wired or wireless data transmission path from another device or apparatus or another unit of the same apparatus, from an external data server or, for example, from a cloud service. Such data content may also be stored in or on any appropriate data storage unit, element, medium, or device, from which the processing unit may obtain the data content.

In general, a capturing device may comprise any type of device incorporating a digital image sensor configured to capture digital image frames. In addition to various types of general purpose computing or communicating devices, the capturing device may be a specific imaging device or apparatus, such as a compact digital camera or a digital single-lens reflex (DSLR) camera.

Metadata of a digital image frame may be generated and arranged according to any appropriate data format, and associated to the corresponding image data in any appropriate manner.

The sequence of media data entities 120 comprises at least one digital image frame 120' that includes an optical machine-readable code 151 comprising a contextual collection identifier and a sharing destination. The digital frame 120' may be referred to as a reference image frame, because subsequent media data entities (120" and onward) are grouped and added to the collection, as discussed below;

while previous media data entities may be removed from context. For example, the media data entity 120''' is shown as preceding the image frame 120' with code, and so 120''' is illustrated in a dashed line on FIG. 1 as one of the entities that may not be used in the contextual collection.

The optical machine-readable code 151 may be captured from an image view 150 that includes the code 151. This is illustrated only schematically, and the image view 150 may comprise other elements or be a generated image view that has the optical machine-readable code 151. Further, the obtained media data entities 120 comprise regular media data entities 120'' each of which may be an image, a video, a document or any other media data entity.

The optical machine-readable code 151 may be a graphic binary code. A Quick Response (QR) code is shown in FIG. 1 for illustration purposes only, but it also represents an example of a graphic binary code in the form of a matrix or two-dimensional barcode forming at least part of an optical machine-readable code. In other embodiments, a two-dimensional barcode may be formed in accordance with some other standard, such as Aztec Code, Data Matrix, or PDF417. In yet other embodiments, instead of a two-dimensional or matrix barcode, a graphic binary code may be a linear or one-dimensional barcodes formed in accordance with any appropriate standard, such as Code 11, Code 25, Code 39, and other "Code" standards, various EAN standards, and various GS1 standards.

"Graphic binary code" refers to a code in which information is coded in a pattern formed of spatially alternating areas of two different colors, e.g. black and white. In addition to different colors distributed in separate areas along a horizontal plane, in some embodiments, such code may further comprise height variations. One example of such codes is a three-dimensional barcode which may be implemented, for example, as a QR type code with the black and/or white regions (or regions with any other appropriate colors) lying at different heights or levels.

"Optical" refers to optically detectable nature of the code, allowing capturing a digital image frame of a scene comprising the time marking, in which digital image frame the code is detectable. "Machine-readable" refers further to the nature of the code allowing detecting and recognizing the information provided by the code in such digital image frame, on the basis of the image data thereof, by digital image processing and analyzing operations.

After obtaining the sequence of media data entities 120, the processing unit 110 is configured to identify the contextual collection identifier and the sharing destination from the optical machine-readable code 151, and create a contextual collection 121 based on the identifier. Recognizing the reference digital image frame 120' which comprises the machine-readable code 151 may be based on detecting the code 151 and determining the reference image frame 120' indicated thereby using any appropriate computer vision or machine vision principles and operations comprising, for example, various image processing algorithms.

The contextual collection 121 can be an album with metadata that is shared among all the media data entities that are in this album. The contextual collection identifier may be a code or any other identifier that is identifiable from an optical machine-readable code. The collection identifier may comprise an album metadata, which is then used by the processing unit 110 to create an album by adding the identifier to the metadata of each media data entity that is added to the collection. The collection identifier may also comprise additional rules for the contextual collection, for example a time interval when media data entities need to be created in order to be added to the collection, or a location requirement for where the media data entities need to be created in order to be added.

The reference frame 120' indicated by the QR code or, in other embodiments, by another optical machine-readable time marking, represents the starting point of a subsequently created contextual collection.

After the processing unit 110 creates the contextual collection 121 based on the contextual collection identifier, it is further configured to add subsequent media data entities (120'' and onward) to the contextual collection 121. In an embodiment, the reference frame 120' may also be added to the contextual collection 121. The word "context" added to the image frames shown in FIG. 1 represents that the media data entities 120'' onwards have been added to the contextual collection 121, and assigned a context that may be added to each media entity's metadata. The processing unit may also be configured to assign additional metadata to the media data entities in the contextual collection 121, wherein this additional metadata identifies user information, for example identifying the user of the apparatus 100. This allows creating the collection with an album-level metadata that may later be assigned to individual media data entities, and does not rely on the media data entities' existing metadata.

The processing unit 110 is configured to receive a selection of media data entities to be shared in the sharing destination 122, and upload the media data entities to the sharing destination 122 based on the selection. The selection may be a user selection of media data entities to be added to the sharing destination. In an implementation, a user may be prompted to select for example images from a contextual collection that he or she wishes to share with other users sharing files with the same context, so after this prompt the processor uploads the selected files to the sharing destination 122. In an embodiment, the selection of media data entities added to the sharing destination 122 is performed automatically based on metadata of the media data images, according to a predetermined set of rules.

Figure 2:
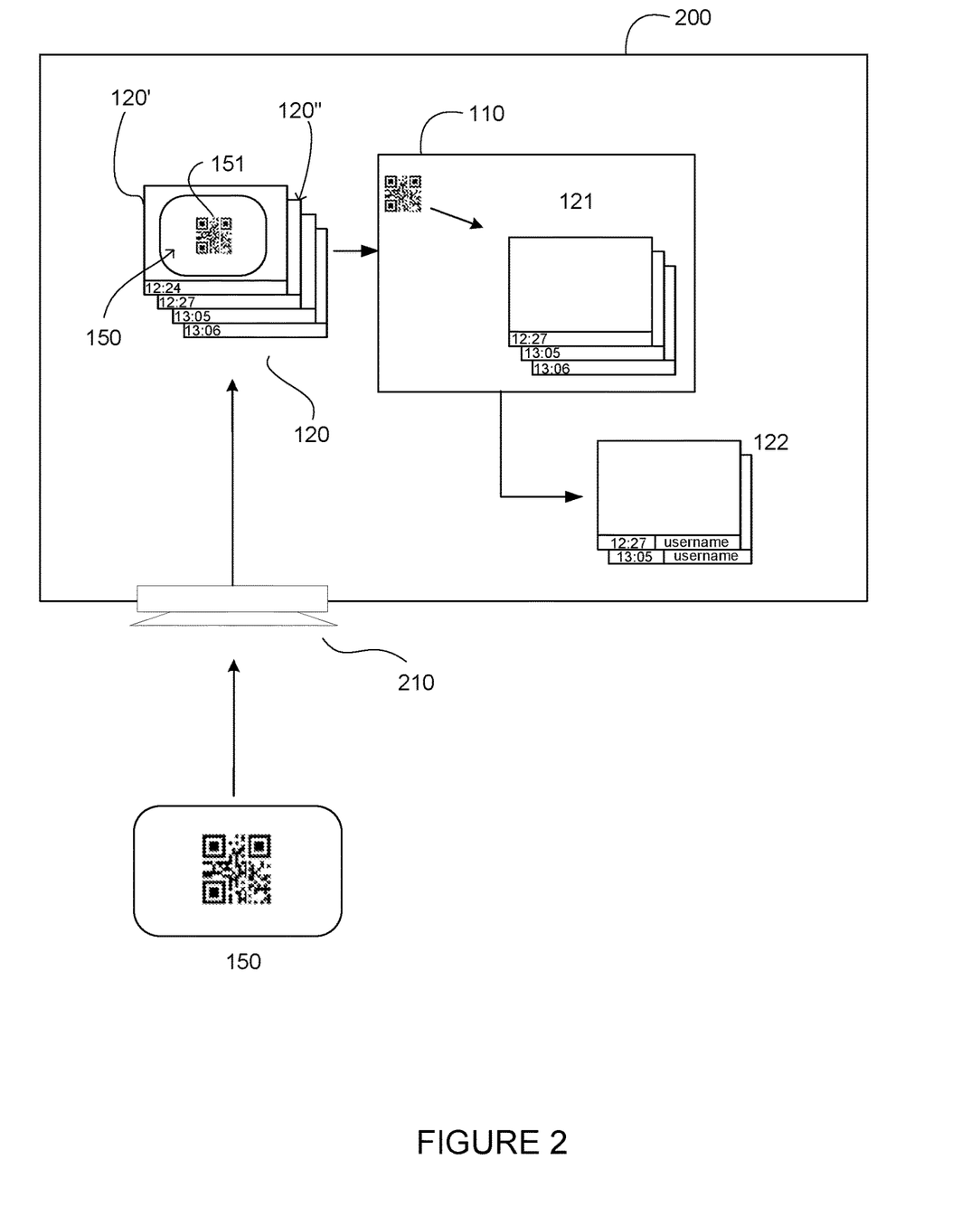
FIG. 2 illustrates schematically an apparatus capable of creating contextual collections and comprising a camera, according to an embodiment.

The sharing destination 122 may be set in a remote storage device, as schematically illustrated in FIG. 1. Alternatively, the sharing destination is set in a local memory of the apparatus 100, as schematically illustrated in FIG. 2. The user selection may be provided by any suitable user input means that the apparatus 100, 200 may comprise.

According to an embodiment, the processing unit 110 is configured to stop adding media data entities to the contextual collection 121 after a predetermined parameter is satisfied. For example, metadata of the entities may be analyzed and an entity that was created later than a predetermined time, or created in a location other than the predetermined location, may trigger the processing unit to stop adding media data entities to the contextual collection 121. Alternatively, the processing unit can be configured to receive user input to remove, or to prevent adding, certain media data entities to the contextual collection 121 in the memory of the apparatus 100. For example, a user may be prompted to select a media data entity that will not be added, or will be removed, from the contextual collection 121 with all subsequent media data entities.

FIG. 2 shows an embodiment wherein the apparatus 200 comprises a digital camera 210 and a memory wherein the sharing destination 122 is set. This is shown for exemplary purposes only, and the sharing destination 122 may be set in any other location as well. If it is set in the local memory of the apparatus 200, other apparatuses according to above embodiments may be set to share the media data entities in the local memory of the apparatus 200.

The digital image camera 220 includes an image sensor and is capable of capturing digital image frames. The processing unit 110 is configured to obtain a sequence of media data entities 120 from the digital camera 210. The digital camera 210 may be implemented, for example, as a digital camera module incorporated in a mobile or portable device such as a mobile phone, a laptop computer, or a tablet computer. The processing unit may 110 be configured to obtain a sequence of digital image frames in real time, and add subsequent digital image frames to the contextual collection 121 as they are captured.

According to an embodiment illustrated in FIG. 2, metadata of media data entities 120', 120" can comprise their time of creation. Other data related e.g. to the image capture, such as location information, may also be included in the metadata obtained together with the sequence of media data entities 120. The processing unit 110 may use the time of capture to determine which media data entities 120" chronologically follow the image frame 120' with the machine-readable code. The processing unit 110 can make this determination by comparing their time of creation and adding entities 120" created after the image frame 120' to the contextual collection 121.

In the embodiment shown on FIG. 2, the processing unit 110 is configured to assign additional metadata to the media data entities 120" in the contextual collection 121, wherein this additional metadata identifies users in the sharing destination 122. This is noted in the Figure by the word "username" in the schematic metadata section of the selected media data entities in the sharing destination 122.

A technical effect of the above embodiments can be the possibility to automatically group images according to a context that is created with the optical machine-readable code. A further technical effect is allowing sharing selected media data entities in the same location as other users that captured the same optical machine-readable code, because that code determines the context and sharing destination.

In embodiments, a processing unit of an apparatus may be configured to obtain media data entities captured by any number of capturing devices and is not limited to one device only.

Figure 3:
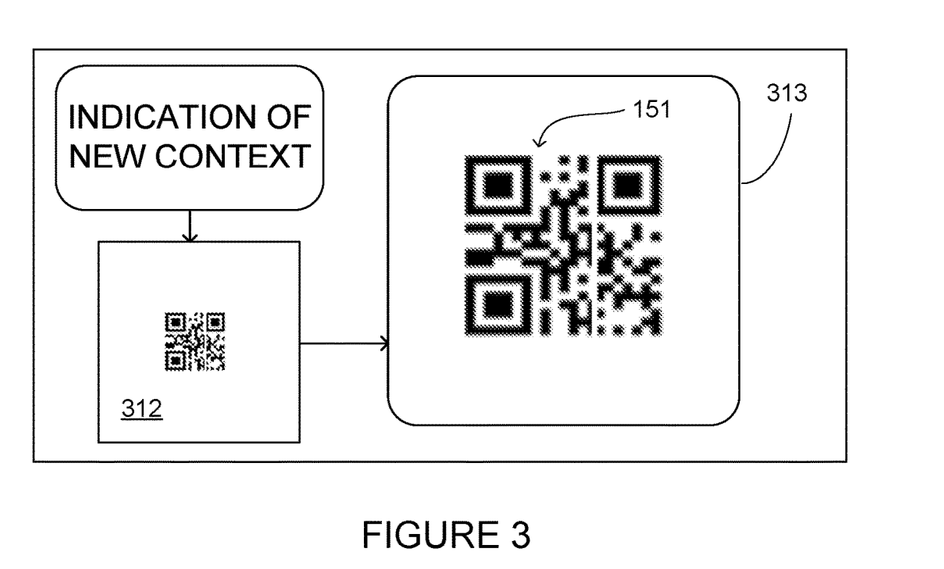
FIG. 3 illustrates schematically an apparatus capable of generating and showing an optical computer-readable code on its display.

FIG. 3 schematically illustrates an embodiment wherein additional operations are performed by the processing unit 110 of apparatuses 100, 200 shown in FIGS. 1-2. The processing unit 110 may be configured to receive an initial indication for creating a contextual collection, create the contextual collection 121 and its identifier, assign a sharing destination 122, and generate (in box 312) an optical machine-readable code 151 comprising the contextual collection identifier.

The apparatus according to the above embodiment may also include a display 313, wherein the processing unit is configured display the generated optical machine-readable code 151 on the display 313.

The machine-readable code 151 may then be captured and used as described above with reference to FIGS. 1-2. The indication for creating a contextual collection may be received in form of a user input, or based on a predetermined prompt such as a phone call, a certain time and date, or any other suitable indication. In an example embodiment, a new contextual identifier may be created based on a digital image with relevant information recognized by a recognition software.

The apparatus 100, 200 may comprise a computer program which, when run on the processor, makes the processor carry out the operations discussed in any the above embodiments. The computer program may also be configured to provide a possibility for creating a new contextual collection identifier and setting a sharing location.

The definitions and advantages discussed above with reference to FIGS. 1 to 3 apply, mutatis mutandis, also to the systems and methods discussed below with reference to FIGS. 4 and 5.

Figure 4:
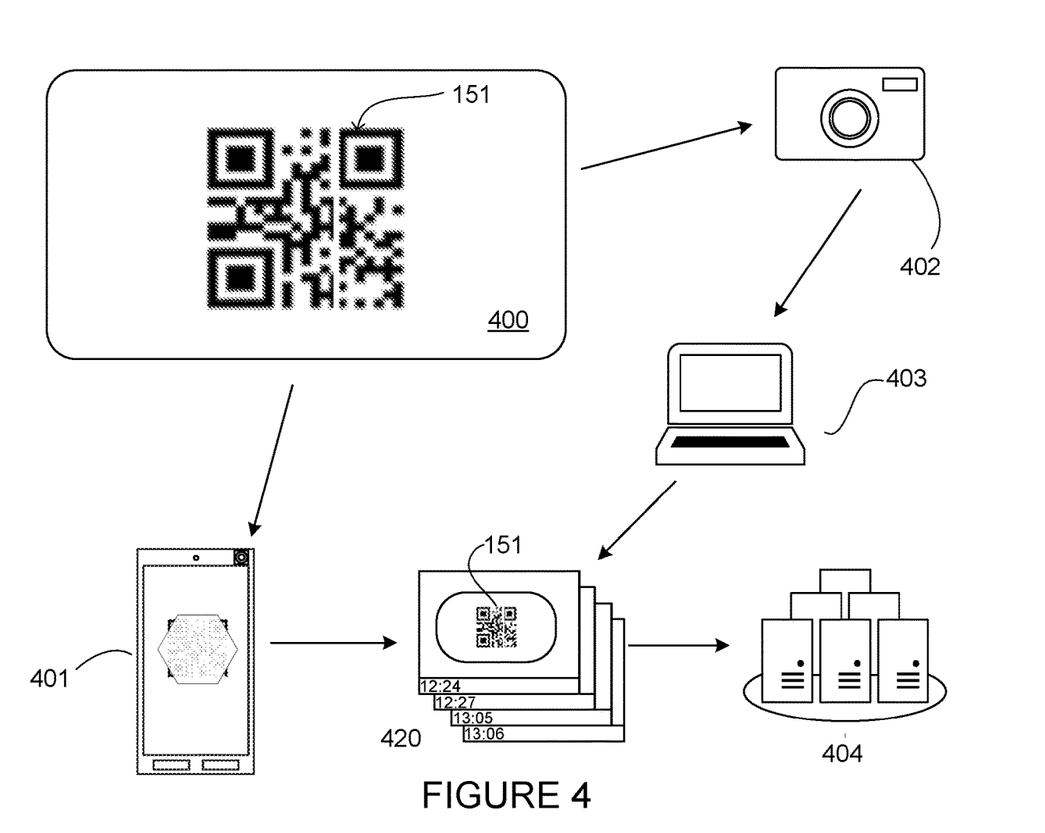
FIG. 4 illustrates schematically a system according to an aspect.

FIG. 4 shows an example of a system according to an aspect. The system may incorporate some of the abovementioned apparatuses and embodiments. The system comprises a context display unit 400, a mobile device 401 comprising a digital camera and a processing unit, a digital camera 402 that can be connected to a computer 403 and a sharing destination 404 illustrated as a server, for example on a cloud.

The context display unit 400 may comprise a display, and is configured to display an optical machine-readable code 151. The context display unit 400 may also comprise a processing unit configured to carry out operations described with reference to FIG. 3, generating the optical machine-readable code 151. Alternatively, the context display unit 400 may be configured to obtain the machine-readable code 151 and display the obtained code 151.

The optical machine-readable code comprises a contextual collection identifier and a destination identifier linked to the sharing destination 404.

The mobile device 401 comprising an in-built camera, and the digital camera 402, are configured to capture images and store them in a chronological order. In an example embodiment, when the camera of the mobile device 401 is pointed at the optical machine-readable code 151, the mobile device 401 may be configured to replace the code 151 with an appropriate shape on the display of the mobile device 401. The shape is schematically illustrated as a hexagon on FIG. 4, and this is only a visual example of any shape that may appear on the screen. This may be performed using an "augmented reality technology" application, and the shape replacing the QR code may be selected based on instructions comprised in the contextual collection identifier or a separate identifier included in the machine-readable code.

The digital camera 402 is configured to transfer the captured chronologically ordered images to a computer 403.

The mobile device 401 and the computer 403 are further configured to identify the contextual collection identifier and the sharing destination from the optical machine-readable code 151, and each create a contextual collection based on the contextual collection identifier. The created contextual collections are local to the mobile device 401 and the computer 403. The mobile device 401 and the computer 403 are configured to add to the contextual collection images that were captured chronologically after the image that includes the optical machine-readable code 151. The mobile device 401 and the computer 403 are further configured to receive a user selection of images to be shared, illustrated as a chronological sequence of images 420, and sharing these images in the sharing destination 404.

The sharing destination 404 is then accessible to view and/or edit by any user of any device that has uploaded images with from contextual collections based on the same contextual collection identifier.

Elements of the system such as the mobile device 401, digital camera 402 and computer 403 should not be interpreted as limiting features, and are presented as specific devices for example purposes only. The system is not limited to the devices, device types and connections illustrated on FIG. 4. The system is also not limited to the number of devices presented on the Figure. As it is clear to a skilled person, the system may include any number of devices and the mobile device 401 or digital camera 402 may be easily replaced with any other suitable electronic apparatus capable of capturing images and/or creating other media data entities.

In the examples of FIGS. 1-4, the reference digital image frame 120' is captured so that the optical machine-readable code 151 covers the main part of the image area. The reference digital image frame is specifically intended for providing the reference time. In other embodiments, reference digital image frames may be used where an optical machine-readable time marking forms a part of a general scene only. This may be the case, for example, in embodiments where only one media data entity with one digital image frame is obtained by a processing unit.

A reference digital image frame for providing the reference time may be captured, for example, from a display of an apparatus, showing the QR code or, in other embodiments, another type of optical machine-readable time marking. Such display may be, for example, a display of a portable or mobile apparatus comprising a reference clock, or a specific display device displaying an optical machine-readable time marking of a reference clock. In the latter case, it is possible, for example, to have a large screen at a venue of a public event or at any public place. People capturing digital image frames at such venue or place may then capture one digital image frame of a scene comprising the screen to serve as a reference digital image frame to provide the reference time information.

Being "configured to" perform the above operations when in use refers to the capability of and suitability of a processing unit for such operations. This may be achieved in various ways. For example, the processing unit may comprise at least one processor and at least one memory coupled to the at least one processor, the memory storing program code instructions which, when run on the at least one processor, cause the processor to perform the action(s) at issue. The program code instructions may be included in a computer program, for example an application, that is, when run on the processing unit, is capable of carrying out the mentioned operations.

Alternatively, or in addition, the functionally described features can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

The processing unit may be a dedicated unit or sub-unit of a larger unit or module, specifically designed for the above operations. Alternatively, it may be a general purpose unit or sub-unit of the apparatus, also configured to operate other operations and actions.

In any embodiment discussed above, a display controller may be implemented as a separate controller or a part of a processing unit.

The operations which the processing units and the display controllers of the apparatuses and systems discussed above with reference to FIGS. 1 to 4 are configured to carry out constitute operations of example methods which may be carried out also by other apparatuses of any appropriate types. The methods discussed below with reference to FIG. 5 may be carried out by apparatuses and systems generally in accordance with any of those discussed above with reference to FIGS. 1 to 4. Those apparatuses, in turn, may operate generally in accordance with any of the methods discussed below with reference to FIG. 5.

Figure 5:
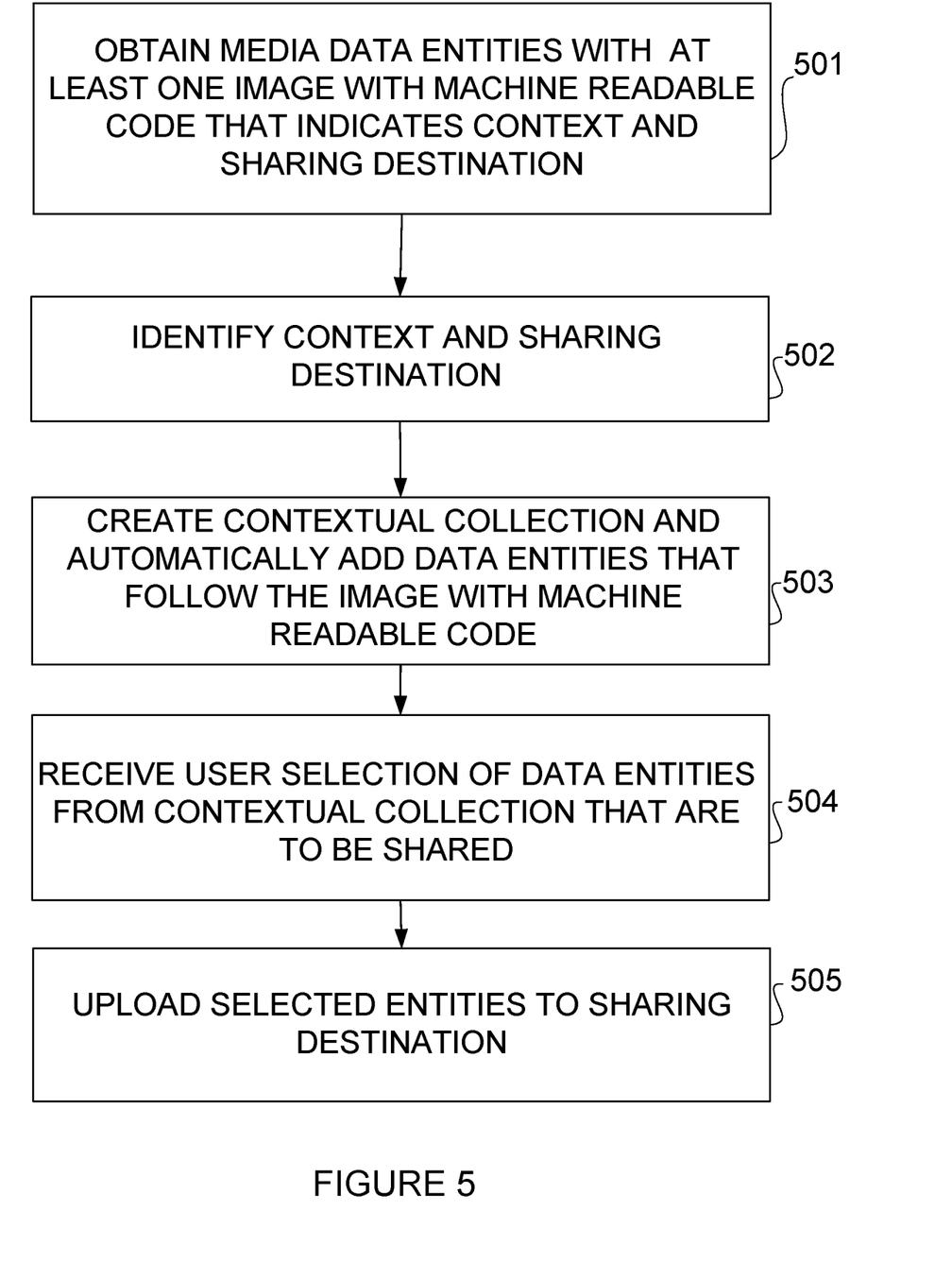
FIG. 5 illustrates a flow chart of a method for sharing media files between two or more devices according to an aspect.

The method of FIG. 5 may be a method of sharing media data entities between two or more devices. The method starts by obtaining, in operation 501, a sequence of media data entities, the media data entities comprising at least one digital image frame that includes an optical machine-readable code comprising a contextual collection identifier and a sharing destination. The optical machine-readable code may comprise a graphic binary code.

In operation 502, the contextual collection identifier and the sharing destination from the optical machine-readable code is identified, which is followed by 503 creating a contextual collection based on the contextual collection identifier and automatically adding subsequent media data entities to the contextual collection.

Then, a user selection of media data entities to be shared in the sharing destination is received in operation 504, and the media data entities are uploaded to the sharing destination based on the user selection in operation 505.

"Automatically" performing one or more operations refers to performing the operation(s) at issue by one or more appropriate data processing units or modules, such as the process units and display controllers discussed above with reference to FIGS. 1 to 4, according to specific rules and procedures, without need for any contribution provided or determination performed by a user of an apparatus or device incorporating such unit or module. In addition to those operations specifically stated to be performed automatically, also other operations may be carried completely or partially automatically.

Some embodiments are further discussed shortly in the following.

According to a first aspect, an apparatus is disclosed. The apparatus comprises a processing unit configured to: obtain a sequence of media data entities, the media data entities comprising at least one digital image frame that includes an optical machine-readable code comprising a contextual collection identifier and a sharing destination; identify the contextual collection identifier and the sharing destination from the optical machine-readable code; create a contextual collection based on the contextual collection identifier; add subsequent media data entities to the contextual collection; receive a user selection of media data entities to be shared in the sharing destination; and upload the media data entities to the sharing destination based on the user selection.

In an embodiment, in addition to the above, the contextual collection identifier comprises an album metadata; and the processing unit is configured to create an album based on the album metadata comprised in the contextual collection identifier.

In an embodiment, alternatively or in addition to the above, the obtained media data entities comprise metadata; and the processing unit is configured to add subsequent media data entities to the contextual collection by adding the contextual collection identifier to the metadata of each of the subsequent media data entities.

In an embodiment, alternatively or in addition to the above, the processing unit is configured to obtain a sequence of media data entities in a chronological order of their creation, and to add to the contextual collection the subsequent media data entities that are created chronologically later than the at least one digital image frame that includes the optical machine-readable code.

In an embodiment, alternatively or in addition to the above, the media data entities comprise a series of digital image frames forming a sequence of pictures or videos.

In an embodiment, alternatively or in addition to the above, the apparatus comprises a digital camera including an image sensor and capable of capturing digital image frames, wherein the processing unit is configured to obtain a sequence of media data entities from the digital camera.

In an embodiment, alternatively or in addition to the above, the processing unit is configured to obtain a sequence of digital image frames in real time, and add subsequent digital image frames to the contextual collection as they are captured.

In an embodiment, alternatively or in addition to the above, the processing unit is configured to obtain a sequence of pre-recorded media data entities from a memory, the memory being selected from: a local storage, a portable memory and a cloud memory.

In an embodiment, alternatively or in addition to the above, the processing unit is configured to create a contextual collection with additional metadata identifying user information in the sharing destination.

In an embodiment, alternatively or in addition to the above, the processing unit is also configured to: receive an initial indication for creating a contextual collection, create the contextual collection and its identifier, assign a sharing destination, and generate an optical machine-readable code comprising the contextual collection identifier and the sharing destination.

In an embodiment, in addition to the above embodiment, the apparatus also comprises a display, wherein the processing unit is configured display the generated optical machine-readable code on the display.

In an embodiment, alternatively or in addition to the above, the sharing destination is set in a remote storage device.

In an embodiment, alternatively to the above embodiment, the sharing destination is set in a local memory of the apparatus.

In an embodiment, alternatively or in addition to the above, the optical machine-readable code comprises a graphic binary code. In an embodiment, the graphic binary code comprises a QR (Quick Response) code.

In an embodiment, alternatively or in addition to the above, the apparatus is implemented as one of: server computer, personal computer, laptop computer, tablet computer, smartphone, mobile phone, and a digital image displaying apparatus.

According to a second aspect, a method is disclosed. The method comprises: obtaining a sequence of media data entities, the media data entities comprising at least one digital image frame that includes an optical machine-readable code comprising a contextual collection identifier and a sharing destination, identifying the contextual collection identifier and the sharing destination from the optical machine-readable code, creating a contextual collection based on the contextual collection identifier, automatically adding subsequent media data entities to the contextual collection, receiving a selection of media data entities to be shared in the sharing destination, and uploading the media data entities to the sharing destination based on the selection.

In an embodiment, in addition to the above, the contextual collection identifier comprises an album metadata; and the method further comprises creating an album based on the album metadata comprised in the contextual collection identifier.

In an embodiment, alternatively or in addition to the above, the obtained media data entities comprise metadata; and the method comprises adding subsequent media data entities to the contextual collection by adding the contextual collection identifier to the metadata of each of the subsequent media data entities.

In an embodiment, alternatively or in addition to the above, the method comprises comprising obtaining a sequence of media data entities in a chronological order of their creation, and automatically adding to the contextual collection the subsequent media data entities that are created chronologically later than the at least one digital image frame that includes the optical machine-readable code.

In an embodiment, alternatively or in addition to the above, the media data entities comprise a series of digital image frames forming a sequence of pictures or videos.

In an embodiment, alternatively or in addition to the above, the method comprises obtaining a sequence of media data entities from a digital camera.

In an embodiment, alternatively or in addition to the above, the method comprises obtaining a sequence of digital image frames in real time, and adding subsequent digital image frames to the contextual collection as they are captured.

In an embodiment, alternatively or in addition to the above, the processing unit is configured to obtain a sequence of pre-recorded media data entities from a memory, the memory being selected from: a local storage, a portable memory and a cloud memory.

In an embodiment, alternatively or in addition to the above, the method comprises creating a contextual collection with additional metadata identifying user information in the sharing destination.

In an embodiment, alternatively or in addition to the above, the method also comprises: receiving an initial indication for creating a contextual collection, creating the contextual collection and its identifier, assigning a sharing destination, and generating an optical machine-readable code comprising the contextual collection identifier.

In an embodiment, in addition to the above embodiment, the method comprises displaying the generated optical machine-readable code on a display.

In an embodiment, alternatively or in addition to the above, the sharing destination is set in a remote storage device.

In an embodiment, alternatively to the above embodiment, the sharing destination is set in a local memory of the apparatus.

In an embodiment, alternatively or in addition to the above, the optical machine-readable code comprises a graphic binary code. In an embodiment, the graphic binary code comprises a QR (Quick Response) code.

According to a third aspect, a method is disclosed. The method comprises: receiving an initial indication for creating a contextual collection, creating the contextual collection and its identifier, assigning a sharing destination for media data entities subsequently added to the contextual collection, generating an optical machine-readable code comprising the contextual collection identifier, and displaying the generated optical machine-readable code on a display.

In a fourth aspect, a computer program, which may be stored on a computer-readable medium, may comprise program code instructions which, when run on a processor, cause the processor to carry out at least part of the operations of the method of the second and/or third aspect or any of the specific embodiments thereof discussed above.

In a fifth aspect, an apparatus is disclosed. The apparatus comprises means for carrying out the operations of any of the methods described above.

In a sixth aspect, a system is disclosed. The system comprises: a context display unit comprising a display and a processor configured to receive an initial indication for creating a contextual collection, create the contextual collection and its identifier, assign a sharing destination, and generate an optical machine-readable code comprising the contextual collection identifier and the sharing destination. The system also comprises at least one digital image-capturing unit and a memory. The image-capturing unit is capable of capturing and storing digital image frames, including images of the optical machine-readable code comprising the contextual collection identifier.

The system also comprises at least one apparatus comprising a processor configured to: obtain a sequence of digital images from the image-capturing unit, the sequence of digital images comprising at least one digital image frame that includes the optical machine-readable code comprising a contextual collection identifier and a sharing destination. The processor is further configured to identify the contextual collection identifier and the sharing destination from the optical machine-readable code, create a local contextual collection based on the contextual collection identifier, add subsequent digital images to the contextual collection, receive a user selection of digital images to be shared in the sharing destination, and upload the digital images to the sharing destination based on the user selection. The apparatus comprising a processor may also comprise the above-mentioned image-capturing unit. Alternatively, the image-capturing unit may be implemented in a separate device.

Although some of the present embodiments may be described and illustrated as being implemented in a smartphone, a mobile phone, a computer, or a camera, these are only examples of a device and not a limitation. As those skilled in the art will appreciate, the present embodiments are suitable for application in a variety of different types of devices, such as portable and portable devices, for example, in lap upper computers, tablet computers, game consoles or game controllers, various wearable devices, etc.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The term "comprising" is used in this specification to mean including the feature(s) or act(s) followed thereafter, without excluding the presence of one or more additional features or acts.

The invention claimed is:

1. An apparatus comprising one or more processors configured to:
obtain a sequence of first media data entities captured with a first image capture device, the first media data entities comprising at least one digital image frame that includes an optical machine-readable code comprising a contextual collection identifier and a sharing destination, the contextual collection identifier defining a time interval in which a media data entity is created in order for the media data entity to be included in the contextual collection,
obtain a sequence of second media data entities captured with a second image capture device, the second media data entities comprising at least one digital image frame that includes the optical machine-readable code comprising a time within the time interval of the contextual collection identifier and the sharing destination; and
based on the obtaining, add the first media data entities and the second media data entities to the contextual collection in the sharing destination.

2. An apparatus as defined in claim 1, wherein the contextual collection identifier comprises an album metadata; and the one or more processors is configured to create an album based on the album metadata comprised in the contextual collection identifier.

3. An apparatus as defined in claim 1, wherein the first media data entities comprise metadata; and the one or more processors is configured to add the second media data entities to the contextual collection by adding the contextual collection identifier to the metadata of each of the second media data entities.

4. An apparatus as defined in claim 1, wherein the one or more processors is configured to obtain the first media data entities in a chronological order-of-creation, and to add to the contextual collection the second media data entities that are created chronologically later than the at least one digital image frame that includes the optical machine-readable code.

5. An apparatus as defined in claim 1, wherein the first media data entities comprise a series of digital image frames forming a sequence of pictures or videos.

6. An apparatus as defined in claim 1, wherein the first image capture device includes an image sensor and capable of capturing digital image frames.

7. An apparatus as defined in claim 6, wherein the one or more processors is configured to obtain a sequence of digital image frames in real time, and add subsequent digital image frames to the contextual collection as they are captured.

8. An apparatus as defined in claim 1, wherein the one or more processors is configured to obtain a sequence of pre-recorded media data entities from a memory, the memory being selected from: a local storage, a portable memory and a cloud memory.

9. An apparatus as defined in claim 1, wherein the one or more processors is configured to create a contextual collection with additional metadata identifying user information in the sharing destination.

10. An apparatus as defined in claim 1, wherein the one or more processors is also configured to:
receive an initial indication for creating a contextual collection,
create the contextual collection and an identifier for the contextual collection,
assign a sharing destination, and
generate an optical machine-readable code comprising the contextual collection identifier and the sharing destination.

11. An apparatus as defined in claim 10, comprising a display, wherein the one or more processors is configured display the generated optical machine-readable code on the display.

12. An apparatus as defined in claim 1, wherein the sharing destination is set in a remote storage device.

13. An apparatus as defined in claim 1, wherein the sharing destination is set in a local memory of the apparatus.

14. An apparatus as defined in claim 1, wherein the optical machine-readable code comprises a graphic binary code.

15. An apparatus as defined in claim 14, wherein the graphic binary code comprises a QR (Quick Response) code.

16. An apparatus as defined in claim 1, implemented as one of: server computer, personal computer, laptop computer, tablet computer, smartphone, mobile phone, and a digital image displaying apparatus.

17. A method, comprising:
- obtaining a sequence of first media data entities captured with a first image capture device, the first media data entities comprising at least one digital image frame that includes an optical machine-readable code comprising a contextual collection identifier and a sharing destination, the contextual collection identifier defining a time interval in which a media data entity is created in order for the media data entity to be included in the contextual collection,
- obtain a sequence of second media data entities captured with a second image capture device, the second media data entities comprising at least one digital image frame that includes the optical machine-readable code comprising a time within the time interval of the contextual collection identifier and the sharing destination, and
- based on the obtaining, automatically adding the first media data entities and the second media data entities to the contextual collection in the sharing destination.

18. A method as defined in claim 17, wherein the optical machine-readable code is a two-dimensional bar code.

19. A method as defined in claim 17, comprising the first media data entities in a chronological order of creation, and automatically adding to the contextual collection the second media data entities that are created chronologically later than the at least one digital image frame that includes the optical machine-readable code.

20. One or more computer-readable hardware storage devices comprising computer-executable instructions that, when executed by one or more processors, cause the one or more processors to perform operations comprising:
- obtaining a sequence of first media data entities captured with a first image capture device, the first media data entities comprising at least one digital image frame that includes an optical machine-readable code comprising a contextual collection identifier and a sharing destination, the contextual collection identifier defining a time interval in which a media data entity is created in order for the media data entity to be included in the contextual collection,
- obtaining a sequence of second media data entities captured with a second image capture device, the second media data entities comprising at least one digital image frame that includes the optical machine-readable code comprising a time within the time interval of the contextual collection identifier and the sharing destination;
- based on the obtaining, adding the first media data entities and the second media data entities to the contextual collection in the sharing destination.

* * * * *